(12) United States Patent
Kowalchuk

(10) Patent No.: US 9,814,176 B2
(45) Date of Patent: Nov. 14, 2017

(54) BELTED SEED TRANSFER MECHANISM

(71) Applicant: CNH Industrial Canada Ltd., Saskatoon, Saskatchewan (CA)

(72) Inventor: Trevor Kowalchuk, Saskatoon (CA)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 61 days.

(21) Appl. No.: 14/554,618

(22) Filed: Nov. 26, 2014

(65) Prior Publication Data

US 2016/0143213 A1    May 26, 2016

(51) Int. Cl.
  *A01C 7/20*  (2006.01)
  *A01C 7/12*  (2006.01)
  *A01C 7/04*  (2006.01)

(52) U.S. Cl.
  CPC ........... *A01C 7/127* (2013.01); *A01C 7/20* (2013.01); *A01C 7/046* (2013.01)

(58) Field of Classification Search
  CPC .... A01C 7/04; A01C 7/08; A01C 7/12; A01C 7/16; A01C 7/20
  USPC ................... 111/170, 171, 183–185
  See application file for complete search history.

(56) References Cited

U.S. PATENT DOCUMENTS

| | | | |
|---|---|---|---|
| 2,871,805 A * | 2/1959 | Behnen | A01C 7/04 111/171 |
| 3,468,441 A | 9/1969 | Longman | |
| 3,688,828 A | 9/1972 | Peterson | |
| 4,193,523 A * | 3/1980 | Koning | A01C 9/08 111/171 |
| 5,992,338 A | 11/1999 | Romans | |
| 5,996,513 A | 12/1999 | Nanbu et al. | |
| 6,681,706 B2 * | 1/2004 | Sauder | A01C 7/04 111/171 |
| 6,913,171 B2 | 7/2005 | Carter | |
| 7,421,960 B2 | 9/2008 | Ahm et al. | |
| 7,490,565 B2 | 2/2009 | Holly | |
| 7,631,606 B2 | 12/2009 | Sauder et al. | |
| 7,665,410 B2 | 2/2010 | Audette | |
| 7,845,294 B1 | 12/2010 | Cade | |

(Continued)

FOREIGN PATENT DOCUMENTS

| | | |
|---|---|---|
| EP | 1870499 | 7/2010 |
| GB | 191208252 | 4/1913 |
| JP | 2005333895 | 8/2005 |

OTHER PUBLICATIONS

U.S. Appl. No. 61/944,623, filed Feb. 26, 2014.*

*Primary Examiner* — John G Weiss
(74) *Attorney, Agent, or Firm* — Rebecca L. Henkel; Rickard K. DeMille

(57) ABSTRACT

The present invention is directed to a seed discharge system is that employs a pair of rotating belts spaced from one another to receive the seeds from a seed metering device and to direct the seeds into the desired location within a trench over which the discharge system is positioned. The seeds are received within a gap formed between the belts and are clamped and held between the belts as the belts move, consequently moving the seeds from the seed metering device to the discharge opening of the discharge system. The constant engagement of the seeds with the belts through the discharge system prevents the seeds from bouncing, thereby maintaining a constant residence time for the seeds within the discharge system.

18 Claims, 4 Drawing Sheets

(56) References Cited

U.S. PATENT DOCUMENTS

| | | |
|---|---|---|
| 8,276,529 B2 | 10/2012 | Garner et al. |
| 8,468,960 B2 * | 6/2013 | Garner .................... A01C 7/20 |
| | | 111/171 |
| 2010/0025415 A1 | 2/2010 | Bichler et al. |
| 2011/0178632 A1 | 7/2011 | Straeter |
| 2015/0059629 A1 * | 3/2015 | Kinzenbaw ............ A01C 7/044 |
| | | 111/200 |
| 2015/0237793 A1 * | 8/2015 | Rans ....................... A01C 7/20 |
| | | 111/177 |

* cited by examiner

BELTED SEED TRANSFER MECHANISM

FIELD OF THE DISCLOSURE

The present invention relates to a mechanism on a seeding machine for transferring or moving seeds from a seed metering system on the seeding machine to the ground.

BACKGROUND OF THE DISCLOSURE

Traditionally on today's planters, seed meters singulate seeds either mechanically or through vacuum pickup method in order to deposit the seeds in an optimal direction with the desired spacing in a trench formed in the ground over which the planter is travelling. The placement and spacing of the seeds deposited by the planter is important as it has significant effects on the yield of the crop obtained from the seeds.

While most seed meters can provide a good singulation and spacing of seeds directly off of the meter, several limitations will affect the actual in-row spacing of seeds in the ground. In particular, after the seeds are singulated in the meters, the seeds are normally deposited into a seed tube that directs the seeds from the meter into the trench. However, inherent variations in the release of the seeds off of the seed meter into the seed tube is one area of trouble that can affect in-row spacing along the trench in which the seed is deposited.

In particular, the mechanical fingers or the holes present in the vacuum disk of the meter cause seeds to discharge from the meter into the seed tube with several velocity vectors, some of which are not parallel to the axis of the seed tube. Because the seed enters the tube with those added velocity vectors, the speed of the individual seed through the tube varies, which in turn varies the in-row spacing of the seeds along the trench. As an added component of this variation, due to the velocity vectors for each seed which may not be parallel to the axis of the seed discharge tube, when the meter releases the seed into the seed tube, the seed can bounce off of the walls of the seed tube further increasing the length of time spent by the seed in the tube and exacerbating the in-row spacing variations.

In one attempt to reduce the variation of the in-row spacing, US Patent Application Publication No US2011/0232554 discloses a seed delivery system for a seeding machine. The delivery system utilizes a belt including a number of elongated bristles disposed thereon. The belt and bristles rotate within a housing disposed adjacent a seed disk such that the bristles separate at a point immediately adjacent the seed disk, allowing the seeds to become entrapped between the bristles. Continued rotation of the belt moved the bristles and seeds to a discharge opening at the bottom of the housing, where the bristles again separate and drop the seed out of the opening and into the trench at a controlled direction and speed.

However, this refinement to a seed delivery system requires that the bristles must be stiff enough to hold the seeds between bristles, but not to allow the seeds to become lodged at a location where they are not readily discharged. As a result, the seeds are held at the outer ends of the bristles as the belts moves around the housing, such that the seeds may contact and be dragged against the housing. This contact with the housing can degrade the seeds and any coating applied to the seeds, which may also be removed by the bristles, and may negatively impact the regular discharge of the seeds by slowing the motion of the seeds and bristles within the housing and/or compressing the seeds into a lower location between the bristles.

As a result it is desirable develop a seed discharge system that enables the seeds to be discharged from the system in a closely controlled speed and direction while allowing the seeds to be moved from the seed metering device to discharge without degrading the seeds or any coating disposed on the seeds.

SUMMARY OF THE DISCLOSURE

According to one aspect of one exemplary embodiment of the present disclosure, a seed discharge system is provided that employs a pair of rotating belts spaced from one another to receive the seeds from a seed metering device and to direct the seeds into the desired location within a trench over which the discharge system is positioned. The seeds are received within a gap formed between the belts and are clamped and held between the belts as the belts move, consequently moving the seeds from the seed metering device to the discharge opening of the discharge system. The constant engagement of the seeds with the belts through the discharge system prevents the seeds from bouncing, thereby maintaining a constant residence time for the seeds within the discharge system.

According to another aspect of one exemplary embodiment of the present disclosure, the seed is frictionally held against both belts as they move through the discharge system. The belts are rotated at constant and similar speeds such that the seeds are moved at the same speed along both belts, thereby minimizing any dragging or scraping of the seeds against any surfaces of the discharge system. Further, the constant and similar speed of each belts enables the seeds to be discharged from between the belts at a consistent and reproducible speed and direction, thereby providing a constant in-row seed spacing.

Numerous additional objects, aspects and advantages of the present invention will be made apparent from the following detailed description taken together with the drawing figures.

BRIEF DESCRIPTION OF THE DRAWINGS

The drawings illustrate the best mode of practicing the present disclosure and preferred exemplary embodiments of the invention are illustrated in the accompanying drawings in which like reference numerals represent like parts throughout.

In the drawings.

DETAILED DESCRIPTION OF THE DISCLOSURE

Figure 1:
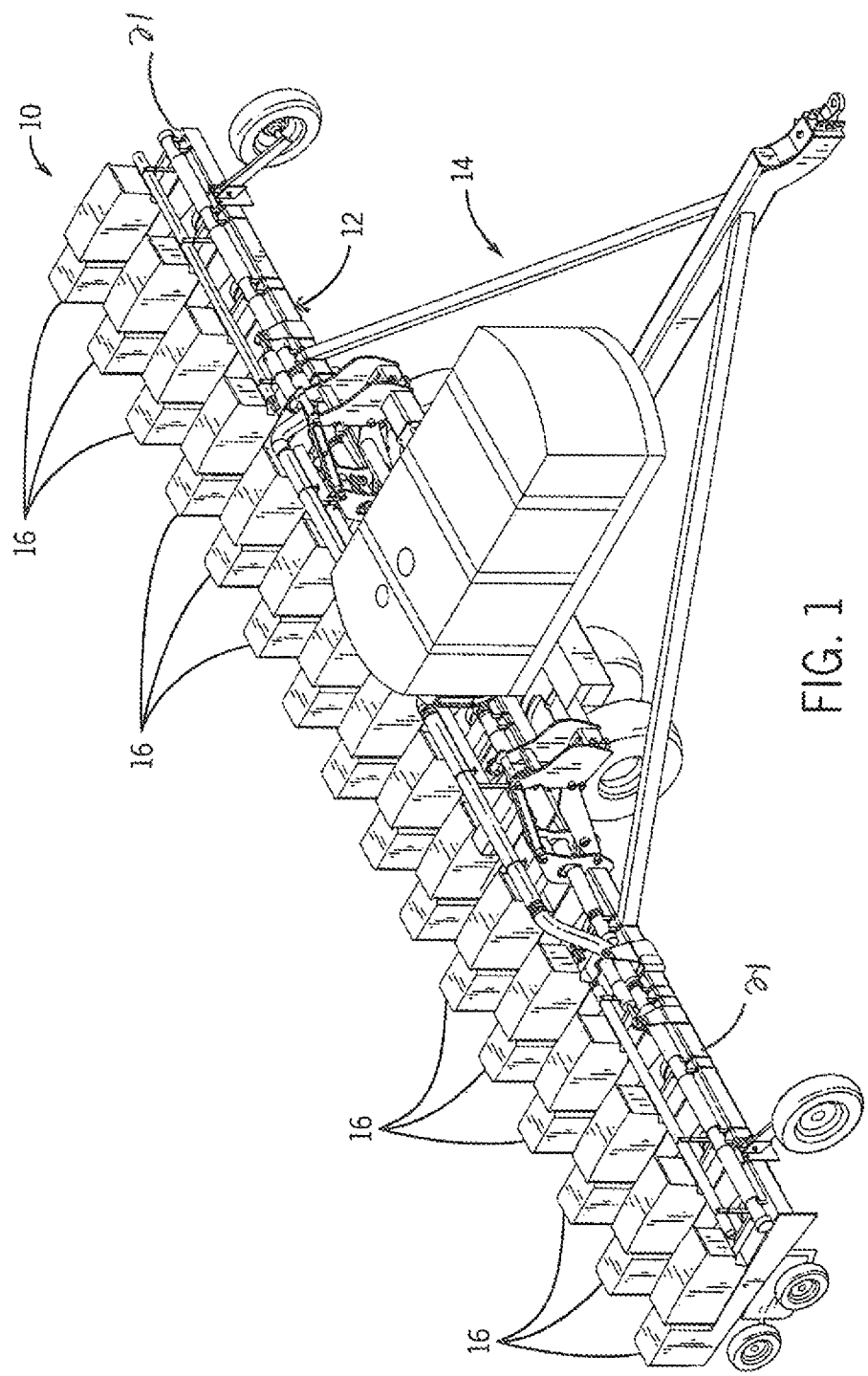
FIG. 1 is an isometric view of a planter or seeding machine including a seed discharge system according to an exemplary embodiment of the present invention.
Figure 2:
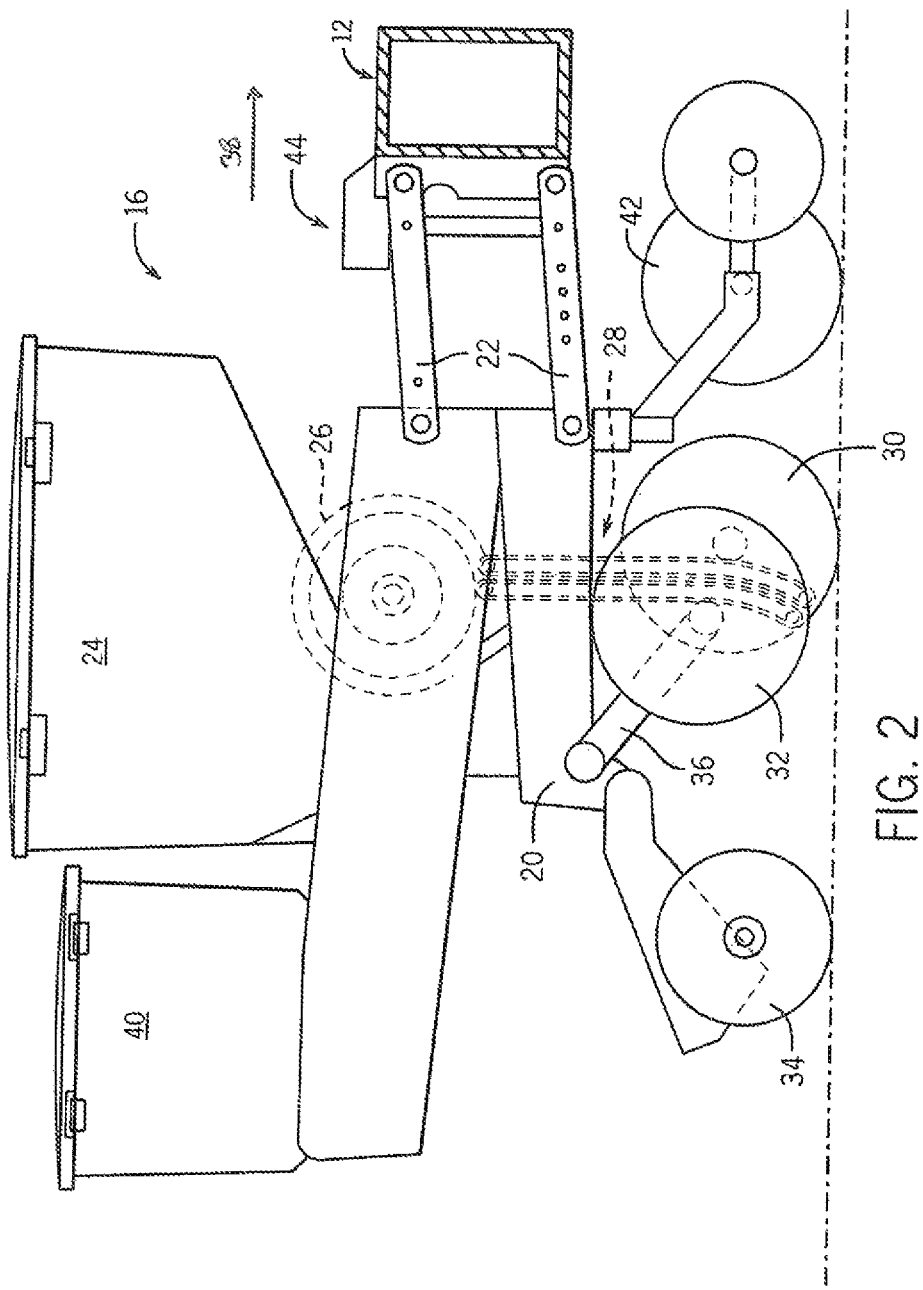
FIG. 2 is a partially broken away side elevation view of a seed metering device and the seed discharge system of FIG. 1.

Referring now to the drawing figures in which like reference numerals designate like numerals throughout the disclosure, FIG. 1 discloses an example planter or seeding machine 10 shown containing the seed delivery system of the present invention. Planter 10 includes a tool bar 12 as part of a planter frame 14. Mounted to the tool bar are multiple planting row units 16. Row units 16 are typically identical for a given planter but there may be differences. A row unit 16 is shown in greater detail in FIG. 2. The row unit 16 is provided with a central frame member 20 having a pair of upwardly extending arms 21 at the forward end thereof. The arms 21 connect to a parallelogram linkage 22 for mounting the row unit 16 to the tool bar 12 for up and down relative movement between the unit 16 and toolbar 12 in a known manner. Seed is stored in seed hopper 24 and provided to a seed meter 26. Seed meter 26 is of the type that uses a vacuum disk as are well known to meter the seed. Other types of meters can be used as well. From the seed meter 26 the seed is carried by a delivery system 28 into a planting furrow, or trench, formed in the soil by furrow openers 30. Gauge wheels 32 control the depth of the furrow. Closing wheels 34 close the furrow over the seed. The gauge wheels 32 are mounted to the frame member 20 by arms 36. The toolbar and row unit are designed to be moved over the ground in a forward working direction identified by the arrow 38.

The row unit 16 further includes a chemical hopper 40, a row cleaner attachment 42 and a down force generator 44. The row unit 16 is shown as an example of the environment in which the delivery system of the present invention is used. The present invention can be used in any of a variety of planting machine types such as, but not limited to, row crop planters, grain drills, air seeders, etc.

Figure 3:
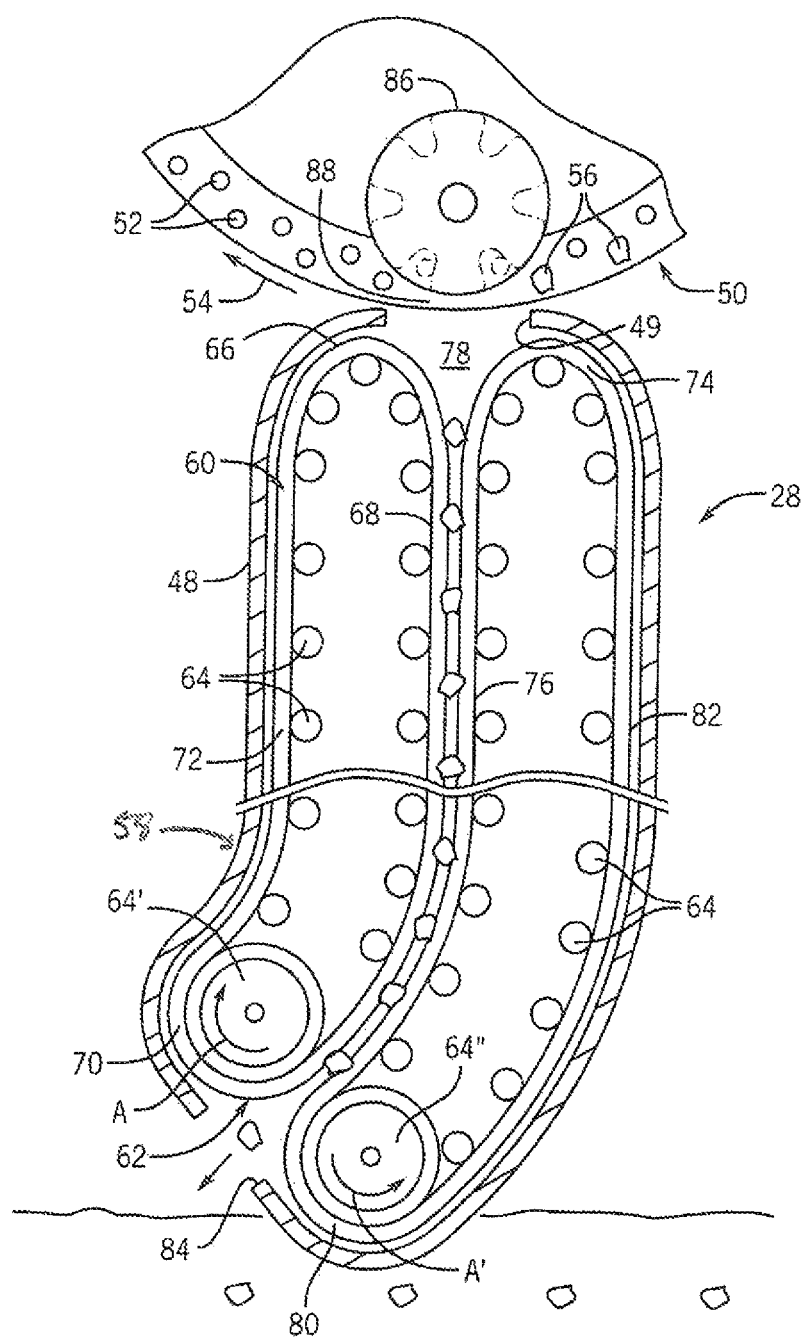
FIG. 3 is a partially broken away side elevation view of the seed discharge system of FIG. 2.

With reference to FIG. 3, an exemplary embodiment of the seed delivery system 28 is shown in greater detail. Delivery system 28 includes a housing 48 positioned adjacent the seed disk 50 of the seed meter 26. The seed disk 50 is a generally flat disk with a plurality of apertures 52 adjacent the periphery of the disk 50. In the seed meter 26, seeds 56 are collected on the apertures from a seed pool and adhere to the disk by air pressure differential on the opposite sides of the disk 50 in a known manner. The disk 50 may have a flat surface at the apertures 52 or have seed cells surrounding the apertures 52, among other suitable constructions. The disk 50 rotates clockwise as viewed in FIG. 3 as shown by the arrow 54. At the right of FIG. 3, seeds 56 are shown adhered to the disk 50.

The seeds 56 are discharged off of the disk 50 in a known manner from the seed meter 26 into an aperture 49 in the housing 48 enclosing a seed transfer mechanism 58 of the delivery system 28 located adjacent the disk 50. In the exemplary embodiment of FIG. 3, a loading wheel 86 is provided adjacent the aperture 49. The loading wheel 86 is positioned on the opposite side of the seeds 56 from the seed transfer mechanism 58 such that the path of the seeds 56 on the disk 50 brings the seeds into a gap 88 formed between the loading wheel 86 and the aperture 49. At the location of the gap 88, the air pressure differential across the seed disk 50 is terminated, freeing the seed 56 from the apertures 52 in the disk 50. The loading wheel 86 contacts the seeds 56 and operates to direct the seeds 56 off of the disk 50 into the aperture 49. In alternative embodiments, the loading wheel 86 can be replaced with a different structure to perform the same function, or eliminated entirely, as the cut off of the vacuum on the disk 50 is sufficient to enable the seeds 56 to fall from the disk 50 into the gap 78.

The mechanism 58 includes a pair of endless belts 60,62 mounted over rollers 64 disposed in the housing 48 that are operably corrected to a motor (not shown) for driving at least one of the rollers 64, such as lower-most roller 64', and consequently moving the belts 60,62 engaged in a suitable manner with the rollers 64 around the path defined by the rollers 64.

The first belt 60 includes an upper end 66 located immediately adjacent the disk 50 and a first section 68 that extends downwardly from the upper end 66. The first section 68 curves outwardly from the upper end 66 in a path defined by the rollers 64 towards the front of the planter 10. The curve of the first section 68 is continuous along the entire first section 68 as defined by rollers 64 spaced along and directing the first belt 60 along the first section 68 until reaching the lower end 70 of the first belt 60. At the lower end 70, the first belt 60 wraps around the lower-most roller 64' and extends upwardly along a second section 72 to the upper end 66. The second section 72 is also directed by one or more rollers 64, but these rollers 64 can have any suitable configuration.

The second belt 62 is positioned next to the first belt 60 and includes an upper end 74 and a first portion 76 extending downwardly from the upper end 74. The second belt 62 is spaced from the first belt 60 at a position to define a gap 78 between the first section 68 of the first belt 60 and the first portion 76 of the second belt 62. The shape of the first portion 76 is configured by the rollers 64 positioned within the housing 48 and engaged with the second belt 62 to maintain the width of the gap 78 along the entire length of the belts 60,62 between the first section 68 and first portion 76. As such, in the exemplary embodiment illustrated in FIG. 3, the first portion 76 of belt 62 has a curved profile that is concave to mirror the curved convex profile of the first section 68 of belt 60. The width of the gap 78 is selected to be slightly less than that of the seed 56, such that the seed 56 is frictionally engaged by each belt 60,62 along the length of the gap 78, without the belts 60,62 compressing and damaging the seed 56, or removing any coating applied to the seed 56.

At a lower end 80, the second belt 62 extends around a lower-most roller 64' which directs the belt 62 away from the first belt 60 and along a second section 82 upwardly towards the upper end 74, which can have any suitable configuration as a result of the placement of the rollers 64 in the housing 48 around which the second belt 62 is positioned.

The belts 60,62 are each engaged with at least one of the rollers 64 around which the respective belts 60,62 are positioned which functions as a drive roller 64'. The drive roller 64' engaged with each belt 60,62 is in turn engaged with a suitable drive mechanism (not shown), such as a connected to a suitable drive transmission, such as a transmission utilized to operate the seed meter 26 in a known manner. The drive rollers 64' are also suitably engaged with the belts 60,62 in a known manner, such as by friction or by elements (not shown) formed on the belts 60,62 that are engaged within complementary structures (not shown) formed on the drive rollers 64' to have the belts 60,62 rotate or move in conjunction with the rotation of the drive rollers 64' at a speed that can be controlled by the operator of the planter 10. The speed of the belts 60,62 as controlled by the rollers 64' can be selected as desired, but in an exemplary embodiment the rollers 64 are operated in order to rotate the belts 60,62 at the same or similar speeds.

In operation, the seed meter 26 is operated to move individual seeds 56 to a point directly above the gap 78 formed between the upper ends 66 and 74 of the belts 60,62, respectively, that is disposed in alignment with the inlet aperture 49 in the housing 48 enclosing the delivery system 28. As shown in FIG. 3, the position of the belts 60,62 around the rollers 64 at the respective upper ends 66,74 converges as the belts 60,62 extend from the upper ends 66,74 towards the gap 78, forming a funnel-like structure below the aperture 49 that directs any seeds 56 not falling directly into the gap 78 along either of the belts 60,62 and into the gap 78. This configuration minimizes the time required for any seed 56 exiting the disk 50 to enter the gap 78, thereby maintaining a constant spacing between the seeds 56 exiting the disk 50. The belts 60,62 are rotated in the opposed clockwise and counterclockwise directions, respectively, shown by arrows A,A' in FIG. 3 such that the belts 60,62 pull the seed 56 downwardly into the gap 78. This pulling effect of the belts 60,62 can be enhanced by forming the belts 60,62 of a suitable tacky or high friction material, such as a rubber, which can optionally have a friction-enhancing coating or structures (not shown) positioned thereon.

As each belt 60,62 moves downwardly along each side of the gap 78, the seed 56 is securely held between the belts 60,62. Further, as the belts 60,62 are moved by the respective drive rollers 64' at the same speed, the seed 56 is not dragged against one of the belts 60,62 by them other, preventing damage from being done to the seeds 56 or any coating on the seeds 56. Also, the material forming the belts 60,62 is flexible enough to enable the belts 60,62 to be slightly deformed by the seed 56 positioned between the belts 60,62, such that the belts 60,62 securely engage the seed 56 as it travels along the length of the gap 78.

When the seed 56 is moved to the lower ends 70,80 of the belts 60,62, the belts 60,62 diverge, consequently widening the gap 78 and disengaging the belts 60,62 from the seed 56. As the seed 56 is disengaged, the speed of the belts 60,62 imparted to the seed 56 as it moved along the gap 78 causes the seed 56 to be released or discharged from the belts 60,62 at a controlled velocity that directs the seed 56 outwardly from the belts 60,62 and through a discharge opening 84 in the housing 48 that is aligned with the gap 78 and the lower ends 70,80 of the belts 60,62. In addition, the angle of the gap 78 at the lower ends 70,80 as defined by the belts 60,62 causes the seed 56 to be directed outwardly from the gap 78 in a specified direction corresponding to the angle of the gap 78. With this controlled speed and direction, the seed 56 can be dispensed by the seed delivery system 26 in a closely controlled manner to achieve optimal spacing of the seeds 56 from one another in the trench over which the system 26 passes.

Figure 4:
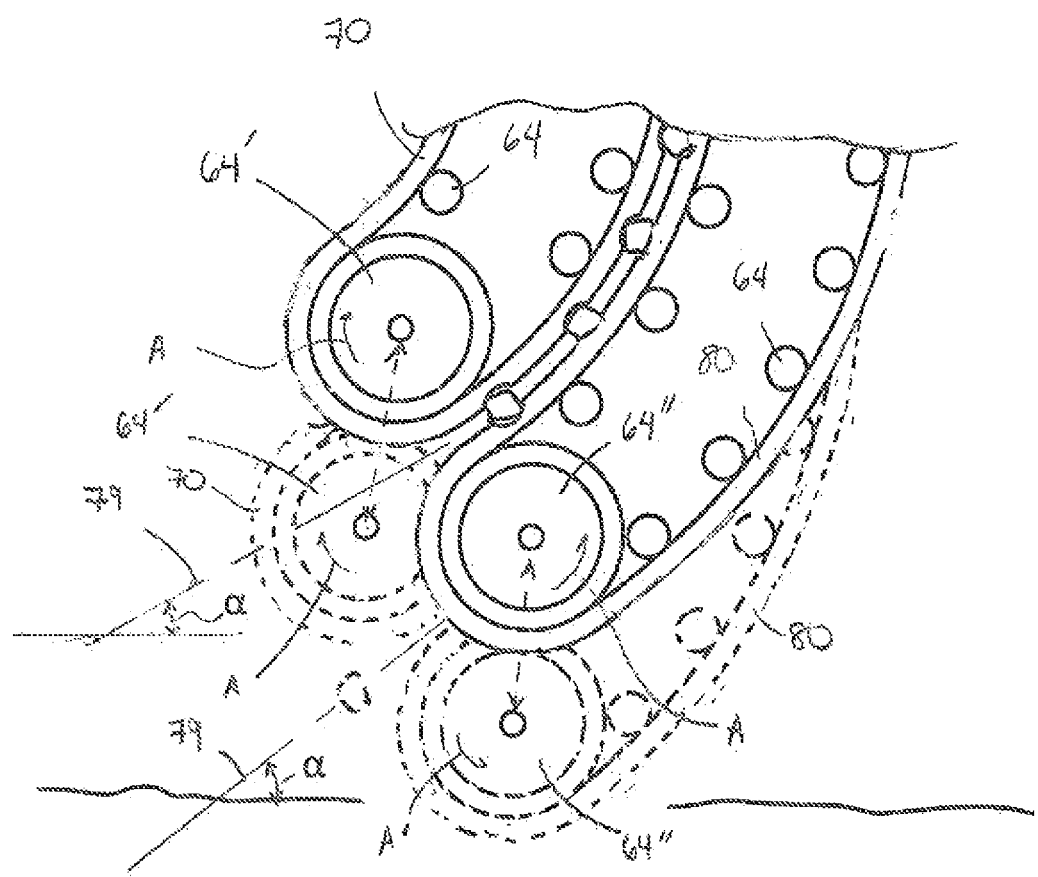
FIG. 4 is a partially broken away side elevation view of the seed discharge system, similar to FIG. 3, showing the angle of the lower ends of the belts being altered.

In alternative embodiments, the speed of the belts 60,62 of the system 26 can be configured to be similar to or greater than the speed of the discharge velocity of the seed 56 from the seed meter 22. Also, in the exemplary illustrated embodiment, the rearward belt 60 is disposed in a curved position to enable the front belt 62 to naturally clamp the seed 56 in the gap 78 between the belts 60,62 as a result of the forward belt 60 wanting to naturally want to contract. Further, as best seen in FIG. 4, the angle of the lower ends 70,80 of the belts 60, 62 can be altered, optionally in an operational mode for the planter 10, by shifting the position of the lowermost rollers 64 to change the discharge angle α for the seeds 56 exiting the gap 78 in the system 26 along discharge axis 79. In this manner, the system 22 can provide the desired spacing between the seeds 56 by changing the discharge angle, optionally in conjunction with a change in the speed of rotation of the drive rollers 64' and belts 60, 62 to bring, the seeds 56 dispensed by the system 28 closer together or further apart.

In other alternative embodiments, the belts 60,62 can be run as speeds corresponding to the speed of the planter 10, i.e., the belts 60,62 are driven faster if ground speed of the planter 10 increases and slower if the planter 10 speed decreases. In this or any other embodiment, the speed of operation of the belts 60,62 is a function of the desired seed population rate and the ground speed of the planter 10 in order to achieve the desired seed population in the furrow. As such, the this alternative embodiment the speed of the belts 60,62 can be made to be variable in view of the actual, and potentially changing, speed of the planter 10, as opposed to constant regardless of the speed of the planter 10.

In still another alternative embodiment, while the speed of the belts 60,62 is typically set to discharge the seed 56 at the same velocity of the forward movement of the planter 10, the belts 60,62 can also be operated at speeds faster or slower than the speed of the planter 10 to achieve a different seed placement effect.

In still a further alternative embodiment, as a substitute for the rollers 64, the seed transfer mechanism 58 can include a guide track (not shown) or similar structure engaged with the belts 60,62 to guide the belts 60,62 within the mechanism 58. The track is formed of a low friction material, such as Teflon®, and moves the belts 60,62 in the desired configuration wider the direction of the drive rollers 64',64" as a less expensive alternative to the rollers 64 with less required maintenance due to dirt buildup and/or seed coating buildup.

Further, in any of the above embodiments, the spacing of the roller 64 or similar guide structures in the mechanism 58 can be variable by mounting the rollers 64 to the housing 48 to enable the rollers 64 to move and accommodate seeds 56 of varying sizes. For example, the rollers 64 can include springs (not shown) that enable the rollers 64 to move in a manner that expands and contracts the size of the gap 78 between the belts 60,62 depending on the size of the seed 56 passing between the belts 60,62, such that the belts 60,62 can engage any type and/or size of seed 56 with the same or a very similar force that can effectively move the seed 56 along the gap 78 without causing damage to the seed 56 or any coating on the seed 56.

Various other alternatives are contemplated is being within the scope of the following claims particularly pointing out and distinctly claiming the subject matter regarded as the invention.

I claim:

1. A seed delivery system for a planter, the system comprising:
   a. a housing including an inlet aperture and a discharge opening;
   b. a pair of belts movably disposed within the housing between the inlet aperture and the discharge opening:
   wherein:
      the pair of belts define a gap therebetween having a width less than that of a seed to be dispensed by the system;
      adjacent surfaces of the pair of belts defining the gap are curved complementary to one another;
      a portion of the gap, between lower portions of the pair of belts extends along a discharge axis defining a direction in which seed is discharged; and
      the discharge axis being adjustable so as to change an angle at which the seed is discharged from the discharge opening.

2. The system of claim 1 further comprising a number of rollers disposed within the housing and around which the pair of belts are positioned.

3. The system of claim 2 wherein at least one of the rollers engaged with each of the pair of belts is a drive roller operably connected to a drive mechanism.

4. The system of claim 3 wherein each of the pair of belts is mechanically engaged with the associated drive roller.

5. The system of claim 4 wherein each of the pair of belts is frictionally engaged with the associated drive roller.

6. The system of claim 1 wherein the pair of belts are formed of a flexible material.

7. The system of claim 1 wherein the width of the gap is consistent between an upper end and a lower end of each of the first belt and the second belt.

8. A planter including the seed delivery system of claim 1.

9. A method for discharging seed from a seed reservoir into a seed trench, the method comprising: a) providing a seed meter operably connected to the seed reservoir and a seed delivery system operably connected to the seed meter, the seed delivery system including a housing having an inlet aperture, a discharge opening and a pair of belts disposed within the housing, the belts defining a gap therebetween having a width less than that of a seed to be dispensed by the seed delivery system;
b) removing a seed from the seed reservoir using the seed meter;
c) transferring the seed from the seed meter into the seed delivery system through the inlet aperture; and
d) dispensing the seed from the seed delivery system out of the discharge opening into the seed trench,
the step of dispensing the seed includes the additional steps of:
1) engaging the seed within the gap defined between the pair of belts; and
2) moving the seed along the belts to the discharge opening;
the gap between the pair of belts defines an arcuate path, a lower portion of the arcuate path extending along a discharge axis defining a direction in which seed is dispensed; and
adjusting the discharge axis so as to change an angle at which the seed is dispensed from the discharge opening.

10. The method of claim 9 wherein the step of moving the seed along the belts comprises rotating the belts with respect to one another.

11. The method of claim 10 wherein the step of rotating the belts comprises rotating the belts in opposite directions.

12. The method of claim 10 wherein the step of rotating the belts comprises rotating the belts at similar speeds.

13. A seed dispensing system including a housing having a seed inlet aperture, a seed discharge opening and a first rotating belt disposed within the housing between the inlet aperture and the discharge opening, the system characterized by a second rotating belt disposed within the housing between the inlet aperture and the discharge opening, wherein:
the first belt and the second belt are spaced from one another to define a gap therebetween having a width slightly less than the width of a seed to be dispensed by the system;
adjacent surfaces of the first and second belts defining the gap are curved complementary to one another; and
a portion of the gap between lower portions of the first and second belts extends along a discharge axis defining a direction in which seed is discharged, the discharge axis being adjustable so as to change an angle at which the seed is discharged from the discharge opening.

14. The system of claim 13 wherein the first belt and second belt rotate in opposite directions with respect to one another.

15. The system of claim 13 wherein the first belt and the second belt rotate at the same speed.

16. The system of claim 13 wherein the width of the gap is consistent between an upper end and a lower end of each of the first belt and the second belt.

17. A planter including the seed delivery system of claim 13.

18. A method of dispensing a seed from a planter using the seed delivery system of claim 13.

\* \* \* \* \*